(12) United States Patent
Sudhir

(10) Patent No.: US 11,096,526 B2
(45) Date of Patent: Aug. 24, 2021

(54) ADAPTABLE COOKING APPARATUS

(71) Applicant: Sanandan Sudhir, Delhi (IN)

(72) Inventor: Sanandan Sudhir, Delhi (IN)

(*) Notice: Subject to any disclaimer, the term of this patent is extended or adjusted under 35 U.S.C. 154(b) by 306 days.

(21) Appl. No.: 16/047,065

(22) Filed: Jul. 27, 2018

(65) Prior Publication Data

US 2020/0029743 A1 Jan. 30, 2020

(51) Int. Cl.
| | |
|---|---|
| *A47J 44/00* | (2006.01) |
| *H05B 6/64* | (2006.01) |
| *A47J 43/046* | (2006.01) |
| *A47J 36/06* | (2006.01) |

(52) U.S. Cl.
CPC .............. *A47J 44/00* (2013.01); *A47J 36/06* (2013.01); *A47J 43/046* (2013.01); *H05B 6/6473* (2013.01)

(58) Field of Classification Search
CPC .......... A47J 44/02; A47J 36/06; A47J 43/046; H05B 6/6473; H05B 6/6408
See application file for complete search history.

(56) References Cited

U.S. PATENT DOCUMENTS

| | | | | |
|---|---|---|---|---|
| 4,086,847 A | * | 5/1978 | Overmyer | B08B 15/005 104/52 |
| 4,858,591 A | * | 8/1989 | Fu | F24C 15/2085 126/299 D |
| 2014/0102434 A1 | * | 4/2014 | Liu | A23B 4/052 126/25 R |
| 2014/0246008 A1 | * | 9/2014 | Martin | F24C 15/027 126/273 A |
| 2016/0338547 A1 | * | 11/2016 | Sudhir | A47J 36/027 |
| 2017/0042360 A1 | * | 2/2017 | Van Schaik | A23L 5/10 |
| 2017/0354294 A1 | * | 12/2017 | Shivaiah | A47J 36/321 |

* cited by examiner

*Primary Examiner* — Brian W Jennison
(74) *Attorney, Agent, or Firm* — D'Ambrosio & Menon, PLLC; Usha Menon

(57) ABSTRACT

A cooking apparatus that combines microwave based heating/cooking with either of blender/mixer grinder functionality and traditional cooking using open flame and/or induction cooking is disclosed. The cooking apparatus comprises a lid and at least one microwave producing device coupled to the lid. A lifting and lowering mechanism carries the lid and microwave producing device at a lower end for enabling vertically raising and lowering the lid along with the coupled microwave producing device. Upper end of lifting and lowering mechanism is slidably configured with a lower side of a chimney. Lid in lowered position gets operatively coupled with a container holding a food item. The container can be one for cooking food using conventional source of heat, or a container for preparatory operations such as blending, stirring, grinding and mixing. Coupling of the lid with the containers enables heating of the contents of the container through the microwaves generated by the at least one microwave producing device.

10 Claims, 12 Drawing Sheets

ADAPTABLE COOKING APPARATUS

FIELD OF INVENTION

The present disclosure relates to an apparatus and method for efficient cooking. More specifically, it relates to a cooking apparatus that can be integrated with other cooking and food preparation implements, thus increasing its utility.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Microwave cooking is a well-established technique. It is particularly well entrenched cooking method at least for city dwellers having fast paced lifestyle. It relies upon microwave energy to cook food quickly and safely. Heating and other cooking operations that may take a long time while using traditional cooking techniques, such as open flame techniques, can be performed much faster using microwave energy.

Presently available microwave cooking devices are generally standalone devices that are capable of doing cooking based on microwave energy alone. Other forms of cooking such as using open flame cooking or induction cooking, or any other cooking related operation such as mixing, blending, grinding or kneading cannot be clubbed along with microwave based heating or cooking using conventional microwave cooking devices.

In view of advantages associated with microwave cooking, it would be useful if a microwave based cooking device could be configured to enable its use along with other kitchen implements such as cooking range, mixers, blinders, grinders etc. This would reduce number of kitchen implements leading to lower overall cost. It would be further advantageous if such a device could be configured in a way not requiring any storage space on cooking platform thereby reducing space requirement in kitchen.

There is therefore a need in the art to provide for a microwave cooking apparatus that can be integrated with other cooking implements.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about" Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

An object of the present disclosure is to provide a microwave based cooking apparatus that combines with other kitchen implements to provide microwave heating/cooking in combination with other preparatory operations and traditional methods of heating/cooking of food.

Another object of the present disclosure is to provide a microwave based cooking apparatus that can be integrated with other cooking implements thereby increasing its utility and reducing number of cooking implements required in kitchen.

Another object of the present disclosure is to provide a microwave based cooking apparatus that does not require any storage space on cooking platform in kitchen.

Yet another object of the present disclosure is to provide for a microwave based cooking apparatus that is always available for integration with other cooking implements.

SUMMARY OF THE INVENTION

Aspects of the present disclosure relate to a cooking apparatus that enables combining of microwave based heating/cooking with either of blender/mixer grinder functionality and traditional cooking using open flame and/or induction cooking. In an aspect, a single cooking apparatus enables this combination thereby reducing number of cooking implements required in kitchen with corresponding saving in cost and space.

In an aspect, the disclosed cooking apparatus comprises a lid and at least one microwave producing device such as a magnetron, coupled with the lid and providing microwaves for microwave-based cooking/heating. The lid and the coupled microwave producing device can be fixed to a lower end of a lifting and lowering mechanism such that the lid along with the coupled microwave producing device microwave producing device can be lowered and lifted up manually and retained in any desired position.

In an aspect, upper end of the lifting and lowering mechanism can be configured with a lower side of a chimney so that the lid along with the coupled microwave producing device can be lowered down over a container placed over a traditional source of heat for cooking and heating, such as a gas stove or an induction plate.

In an aspect, upper end of the lifting and lowering mechanism can be moved horizontally by sliding relative to the lower side of a chimney so that the lid along with the coupled microwave producing device can be positioned over a second container belonging to a blending, stirring, grinding and mixing device.

Thus, the lid in a lowered position can be operatively coupled with a container holding a food item, and wherein the container is any one of a first container for cooking food using conventional source of heat, and a second container for preparatory operations comprising any or a combination of blending, stirring, grinding and mixing. In an aspect, coupling of the lid of the proposed apparatus with the containers enables heating of the contents of the container through the microwaves generated by the microwave producing device.

In an aspect, the cooking apparatus farther includes a rectangular frame configured on the lower side of the chimney, and the frame, besides holding the upper end of the lifting and lowering mechanism, enables the horizontal sliding functionality for sliding of the lifting and lowering mechanism along with the lid and the coupled microwave producing device. The rectangular frame incorporates a pair of slots in two opposite sides of the frame to hold and enable sliding of the upper end of the rectangular flame.

In an aspect, the lifting and lowering mechanism comprises a top flange that engages with the slots in the frame. The top flange can incorporate a pair of L shaped support lugs projection out of outer periphery of the top flange at two diametrically opposite locations. The L shaped support lugs can be oriented such that they engage with the pair of slots in the two opposite sides of the rectangular frame to support the upper end of lifting and lowering mechanism, as well as to allow sliding of the lifting and lowering mechanism along with the attached lid and the coupled microwave producing device in the horizontal direction.

In an aspect, the lifting and lowering mechanism can further comprise a metallic bellow having an upper end fixed to the top flange and a lower end fixed to the lid; and a plurality of weight balancing linkages assembled in a set pattern with fiction hinges to enable manual lifting and lowering of the lid and the coupled microwave producing device. Thus, the set pattern of the plurality of weight balancing linkages allows assembly of the weight balancing linkages to move between an extended position and a collapsed position. The assembly of the weight balancing linkages is located within the bellow; and upper end of the assembly of the weight balancing linkages is fixed to the top flange and a lower end is fixed to the lid to enable manual lifting and lowering of the lid and the coupled microwave producing device. The friction hinges hold the lid and the at least one microwave producing device in any desired position.

In an aspect, in the lowered position of the lid, when the lid couples with the container, the lid and the container form an enclosed space for holding the food items.

In an aspect, the lid can be coupled to the at least one microwave producing device through wave guide to guides microwaves generated by the coupled microwave producing device for their transfer from the microwave producing device to the container.

In an aspect, the lid and the first container can be of a hemispherical shape to enable reflection of microwaves inside the lid and the container for efficient cooking.

In an aspect, the cooking apparatus can includes at least one power transformer for regulating input power to the at least one microwave producing device, which can be located within the chimney.

In an aspect, the cooking apparatus can incorporate a display screen for user interface.

In an aspect, the cooking apparatus, when being used with the second container, can allow simultaneous or iterative use of any or a combination of heating, stirring, blending and grinding.

In an aspect, the cooking apparatus, when being used with the first container, can allow simultaneous or iterative use of any or a combination of microwave cooking and conventional cooking.

In an aspect, top of the container can include chokes for preventing leakage of microwaves during working.

In an aspect, the cooking apparatus can be configured as a remotely operable device through any or a combination of Internet, Wi-Fi, Bluetooth, Zigbee, and Near-Field Communication (NFC).

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE INVENTION

Figure 1:
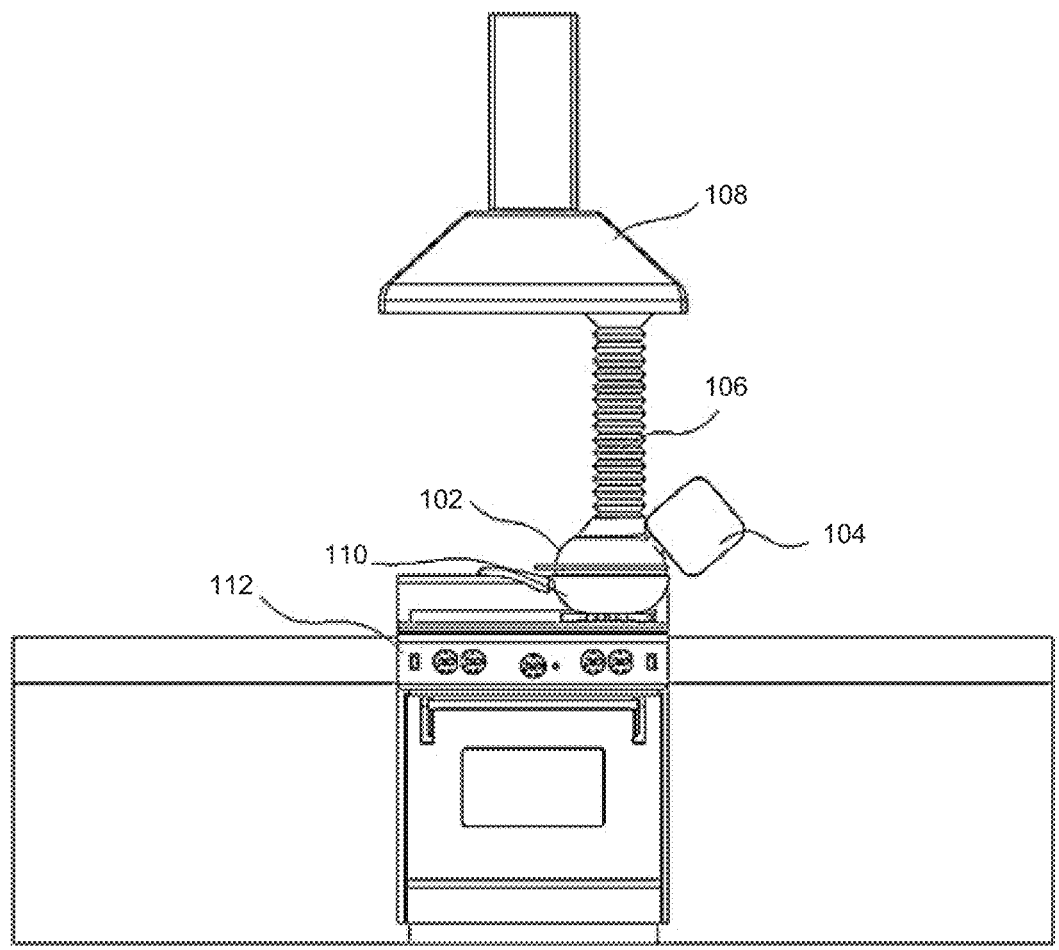
FIG. 1 illustrates an exemplary front view showing general arrangement of the proposed microwave based cooking apparatus installed with chimney over a cooking range, in accordance with an exemplary embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms are used herein. To the extent a term used in a claim is not defined, it should be given the broadest definition persons in the pertinent art have given that term as reflected in printed publications and issued patents at the time of filing.

The present invention discloses a cooking apparatus that enables, using a single microwave generating apparatus, to combine microwave heating/cooking functionality with blender/mixer grinder or with traditional cooking.

In an aspect, the disclosed cooking apparatus can include a lid coupled with at least one microwave producing device such as a magnetron, that acts as a source of microwaves, wherein the lid can be configured with lower side of a chimney such that it can be horizontally moved to be placed over a first container being used for cooking using a traditional heat source, or over another container that is part of a grinder/mixer/blender. Thus, the single cooking apparatus enables combining of microwave-based heating/cooking with either the blender/mixer grinder functionality or traditional cooking using open flame and/or induction cooking reducing number of cooking implements required in kitchen with corresponding saving in cost and space.

In an aspect, horizontal sliding of the lid and the coupled microwave producing device is facilitated by a sliding coupling between a rectangular frame fixed to lower side of the chimney and a top flange of a lifting and lowering mechanism. The top flange is part of a lifting and lowering mechanism and incorporates a pair of L shaped support lugs projection out of its outer periphery at two diametrically opposite locations and oriented such that they engage with a pair of slots in the two opposite sides of the rectangular frame. The engagement between the L shaped support lugs and the corresponding slots not only supports an upper end of the lifting and lowering mechanism, as well as to allows sliding of the lifting and lowering mechanism along with the lid and the coupled microwave producing device that are attached to lower end of the lifting and lowering mechanism, in the horizontal direction.

In an aspect, the lifting and lowering mechanism further incorporates a plurality of weight balancing linkages assembled in a set pattern with fiction hinges configured between them to enable manual lifting and lowering of the lid and the coupled microwave producing device. Thus, the set pattern of the plurality of weight balancing linkages allow assembly of the weight balancing linkages to move between an extended position and a collapsed position. Upper end of the assembly of the weight balancing linkages is fixed to the top flange and its lower end is fixed to the lid to enable manual lifting and lowering of the lid and the coupled microwave producing device. The friction hinges hold the lid and the at least one microwave producing device microwave producing device in any desired position.

The assembly of the weight balancing linkages is located within a bellow having an upper end fixed to the top flange and a lower end fixed to the lid.

Figure 2A:
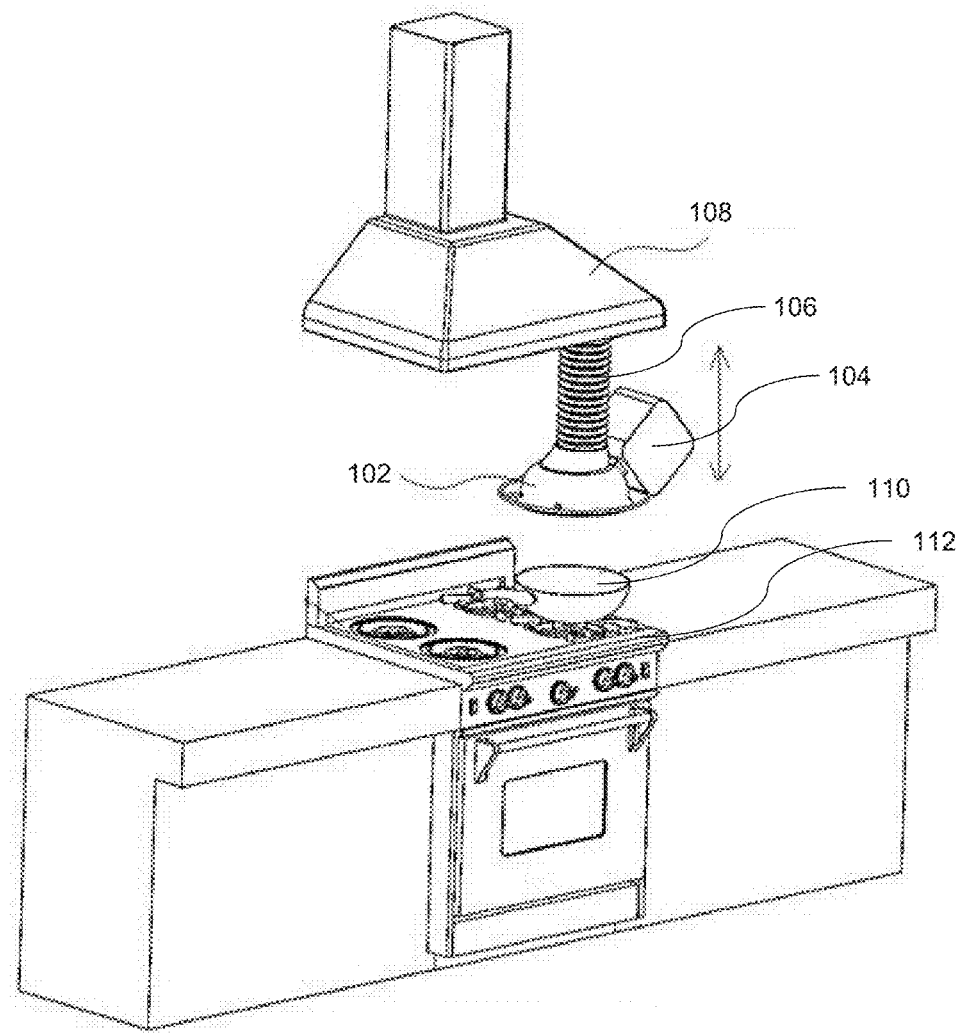
FIGS. 2A and 2B illustrate exemplary perspective views respectively showing a lid of the proposed cooking apparatus positioned above but away from a cooking container, and positioned to cover the cooking container, in accordance with an exemplary embodiment of the present disclosure.
Figure 2B:
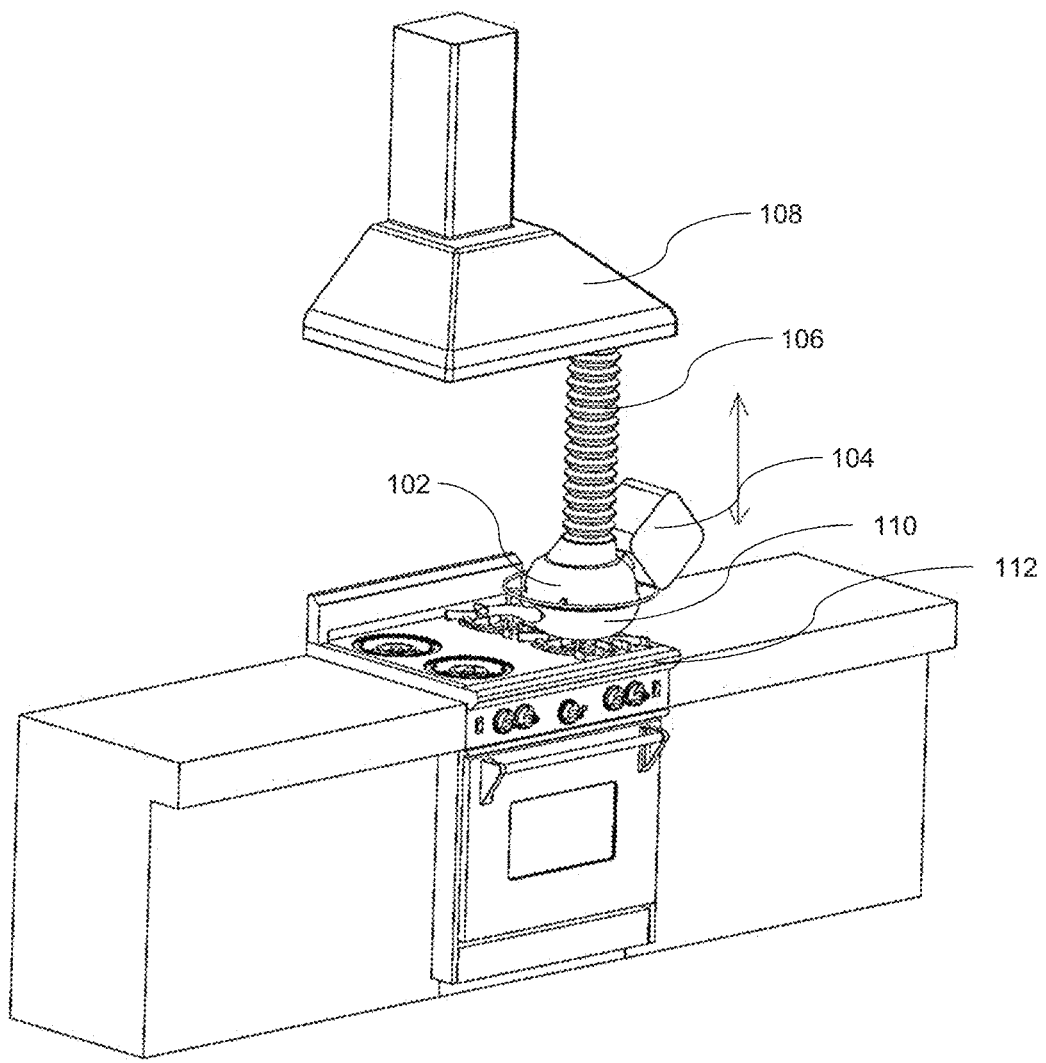

Referring now to FIGS. 1, 2A and 2B, where exemplary views showing general arrangement of the proposed microwave-based cooking apparatus installed with chimney over a cooking range are disclosed, the proposed cooking apparatus can include a lid 102, at least one microwave producing device such as a magnetron e 104 coupled to the lid 102. The lid 102 and the coupled microwave producing device 104 can fixed to lower end of a lifting and lowering mechanism 106. Upper end of the lifting and lowering mechanism 106 can be coupled to lower side of chimney 108. Thus, the lid 102 and the coupled microwave producing device 104 are suspended from the chimney 108 with help of the lifting and lowering mechanism 106. The lifting and lowering mechanism 106 can be configured to enable manual lowering and raising of the lid 102 along with the coupled microwave producing device 104, and hold them in any desired position.

Also shown in FIG. 1 is a container 110 (also referred to as a first container 110) positioned on a heat source, such as a gas burner/stove built into a gas range 112, and the lid 102 covering the container 110. The proposed cooking apparatus in this position enables combining of microwave cooking/heating with a traditional cooking media, in an aspect, the disclosed cooking apparatus, when being used with the first container 110 in the manner shown in FIG. 1, can allow simultaneous or iterative use of any or a combination of microwave cooking and conventional cooking.

In an aspect, the lid 102 and the first container 110 can be of a hemispherical shape to enable reflection of microwaves inside the lid 102 and the container 110 for efficient cooking. In an aspect, in the lowered position of the lid 102, when the lid couples with the container 110, the lid 102 and the container 110 form an enclosed space for holding the food items.

In an aspect, the cooking apparatus can incorporate a display screen located at a suitable location, for user interface. In an exemplary embodiment, user interface can be a touch sensitive display that can receive inputs from various sensors and timers and in turn control the duration and power of microwaves being generated by microwave producing device 104 using appropriate control circuits, relays etc., as is well known in the art. In an exemplary embodiment, the microwave producing device 104 can form part of lid 102 itself and can be fully integrated with the lid 102. The lid 102 and microwave producing device 104 can be so designed and operatively connected so that microwaves generated by microwave producing device 104 are directed towards container that lid 102 is designed to cover. In an implementation, there can be a wave guide to direct the generated microwaves to the container.

In an aspect, the cooking apparatus, when being used with the first container 110, can allow simultaneous or iterative use of any or a combination of microwave cooking and conventional cooking through the interface.

In an aspect, top of the container can include chokes for preventing leakage of microwaves during working.

In an aspect, the cooking apparatus can be configured as a remotely operable device through any or a combination of Internet, Wi-Fi, Bluetooth, Zigbee, and Near-Field Communication (NFC). In another aspect, the apparatus or any of its sub-assemblies can also act as an Internet of Things (IoT) device, and connected/controlled through any or a combination of Internet, Wi-Fi, and Bluetooth.

FIGS. 2A and 2B illustrate exemplary perspective views respectively showing the lid 102 of the proposed cooking apparatus positioned above but away from the first cooking container 110, and positioned to cover the first cooking container 110 to provide microwave based heating to contents of the first container 110.

Figure 3:
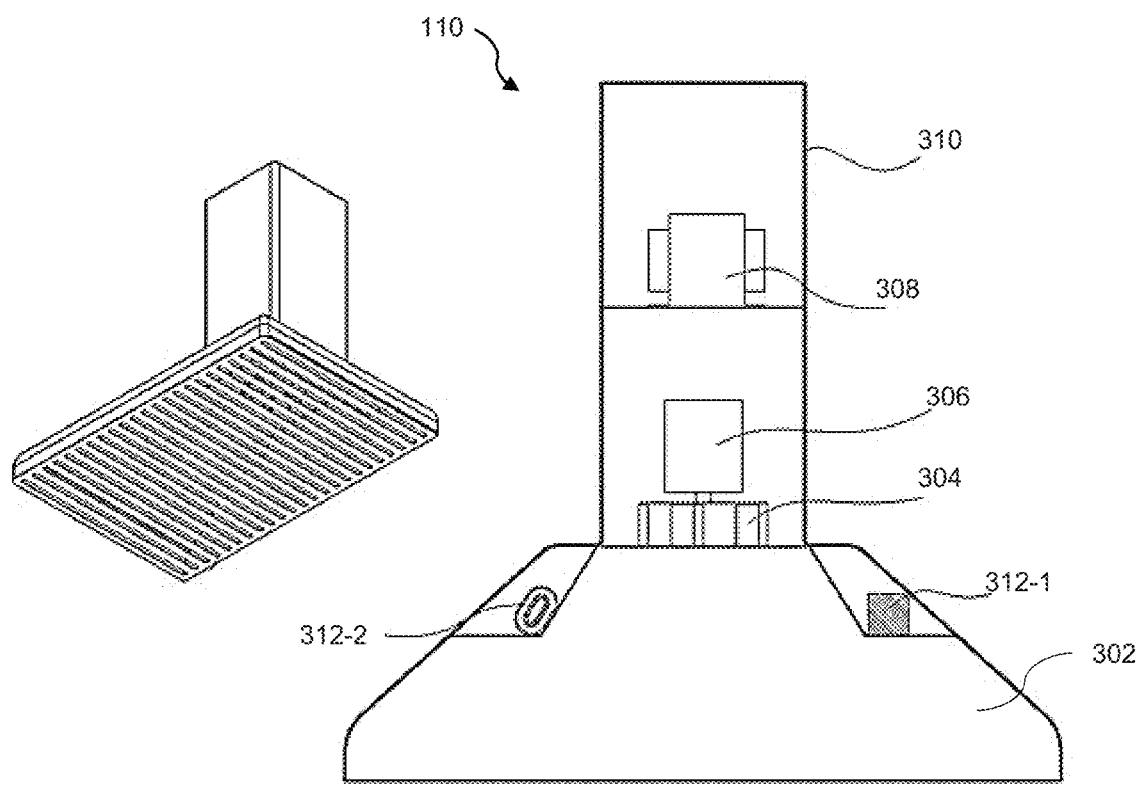
FIG. 3 illustrates details of the chimney showing installation of various components of the proposed cooking apparatus, in accordance with an exemplary embodiment of the present disclosure.

FIG. 3 illustrates details of the chimney 108 showing installation of various components of the proposed cooking apparatus, in accordance with an exemplary embodiment of the present disclosure. As shown, the chimney 108 comprises a hood. 302, a duct 310, an exhaust fan 304 positioned at junction of the hood 302 and the duct 310, and a motor 306 that drives the exhaust fan 304. In an aspect, a transformer to meet power requirement of the microwave producing device (not shown here), such as transformer 308 can be located in the duct 310. Other electrical components of the microwave producing device such as parts 312-1 and 312-2, can be accommodated at suitable places in the hood 302.

Figure 4:
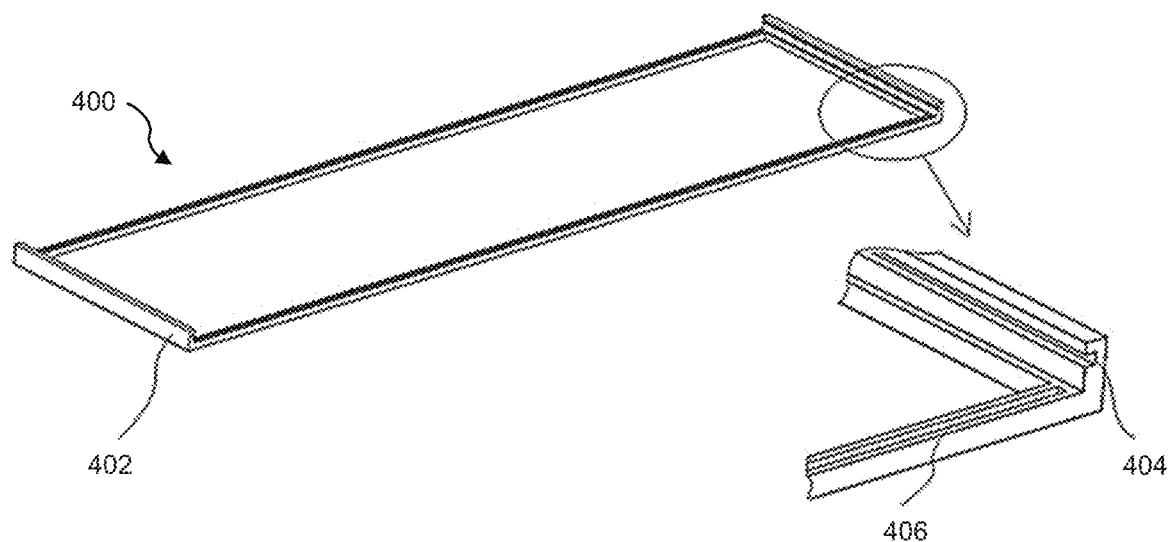
FIG. 4 illustrates details of a frame provided below hood of the chimney for slidably fixing the proposed cooking apparatus, in accordance with an exemplary embodiment of the present disclosure.

FIG. 4 illustrates details of a frame provided below hood of the chimney for slidably fixing the proposed cooking apparatus, in accordance with an exemplary embodiment of the present disclosure. The rectangular frame 400 is adapted to be fixed on lower side of the chimney hood by means of slots 404 in guide rails 402 that form two opposite sides of the frame 400. Other two sides can incorporate a pair of slots 406, one on each of the two opposite sides of the frame 400, to support the lifting and lowering mechanism of the proposed cooking apparatus.

Figure 5:
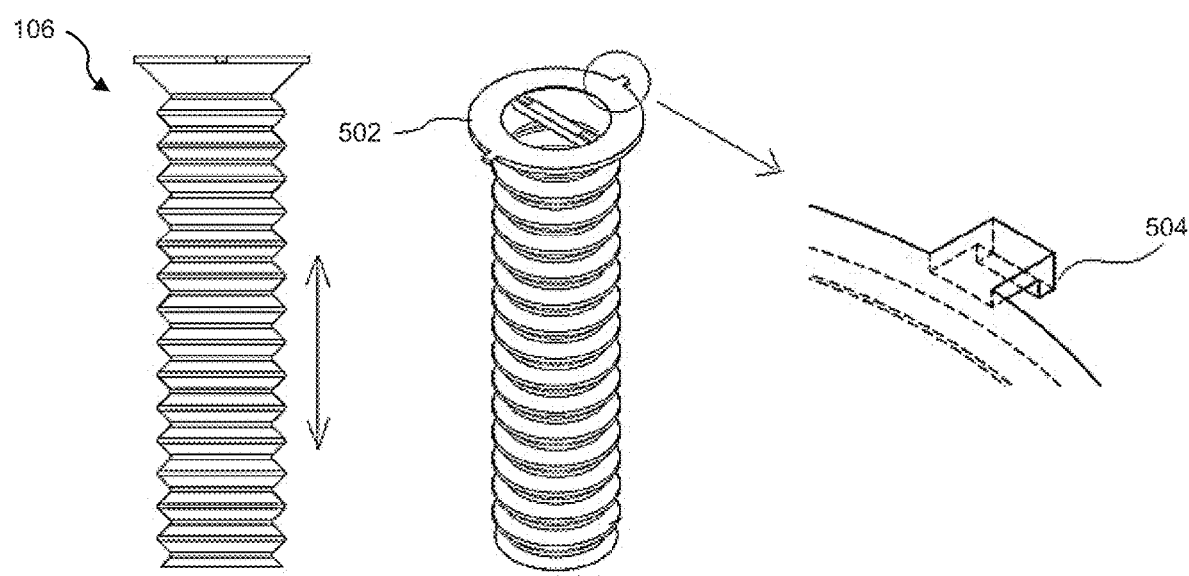
FIG. 5 illustrates details of top flange used to support the lifting and lowering mechanism on the frame, in accordance with an exemplary embodiment of the present disclosure.

FIG. 5 illustrates details of top flange used for fixing the lid and microwave producing device assembly with the chimney through the frame and the titling and lowering mechanism. The titling and lowering mechanism 106 incorporates a top flange 502, which incorporates a pair of L shaped support lugs 504 projecting out of outer periphery of the top flange 502 at two diametrically opposite locations. The L shaped support lugs 504 can be oriented such that they engage with the pair of slots 406 (refer to FIG. 4) on the two opposite sides of the rectangular frame 400 to support the upper end of lifting and lowering mechanism 106, as well as to allow sliding of the lifting and lowering mechanism 106 along with the attached lid 102 and the coupled microwave producing device 104 in the horizontal direction.

Figure 6:
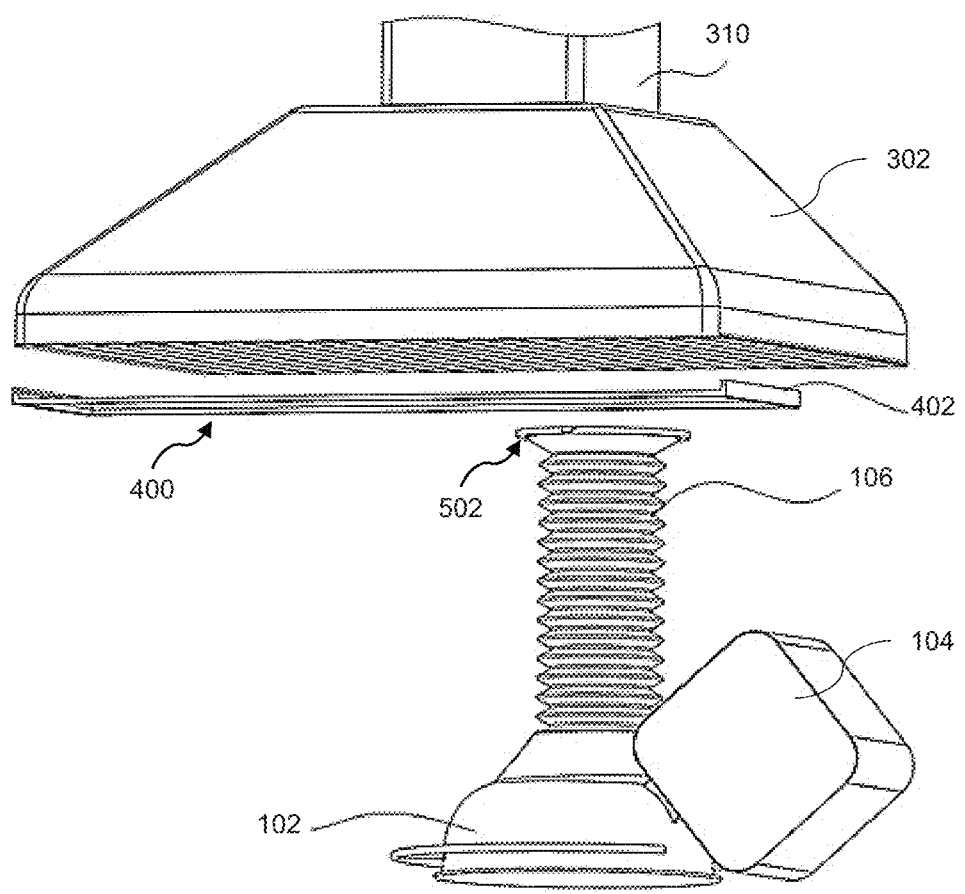
FIG. 6 illustrates an exploded view showing the chimney, the frame and the lifting and lowering mechanism for coupling the proposed cooking apparatus with the chimney, in accordance with an exemplary embodiment of the present disclosure.
Figure 7:
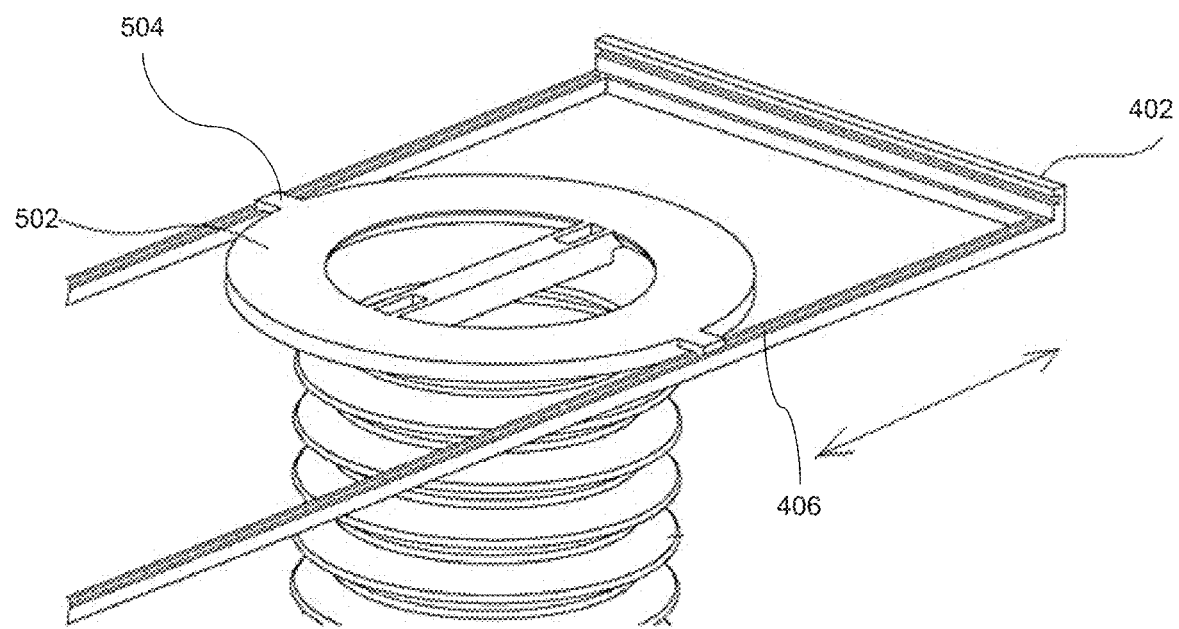
FIG. 7 illustrates details showing top flange of the of the lifting and lowering mechanism slidably resting in slots in the frame, in accordance with an exemplary embodiment of the present disclosure.
Figure 8:
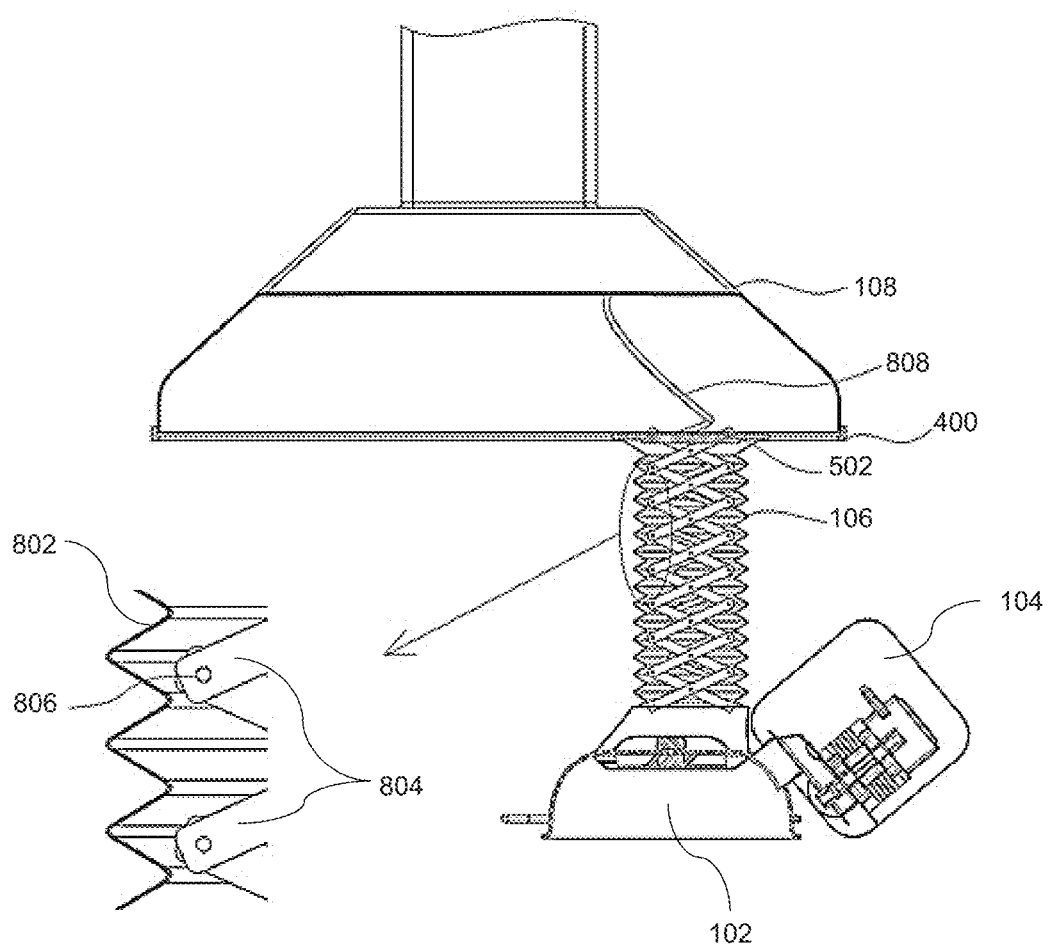
FIG. 8 illustrates details of the lifting and lowering mechanism incorporating metal bellow and weight balancing linkages joined by friction hinges located with the metal bellow, in accordance with an exemplary embodiment of the present disclosure.

FIG. 6 illustrates an exploded view showing the chimney hood 302, the frame 400 and the lifting and lowering mechanism 106 for coupling the proposed cooking apparatus with the chimney. As shown upper end having the top flange 502, of the lifting and lowering mechanism 106 gets slidably engaged with the frame 400, which is fixed to bottom side of the chimney hood 302, FIG. 7 illustrates details showing top flange 502 of the lifting and lowering mechanism 106 slidably resting in slots 406 in the frame 400, FIG. 8 illustrates details of the lifting and lowering mechanism 106, wherein as shown, the lifting and lowering mechanism 106 incorporates a metal bellow 802 and a plurality of weight balancing linkages 804 located within the metal bellow 802. The weight balancing linkages 804 can be joined through friction hinges 806 in a set pattern form an assembly of the linkages. The set pattern of the plurality of weight balancing linkages 804 allows assembly of the weight balancing linkages to move between an extended position and a collapsed position. Upper end of the assembly of the linkages can be fixed to the top flange 502 and the lower end can be fixed to the lid 102, thereby enabling manual lowering and lifting of the lid 102 and the coupled microwave producing device 104 as the assembly of the linkages move between the extended position and the collapsed position. A cable such as 808 can supply power to the microwave producing device 104 from the transformer.

As shown, the assembly of the weight balancing linkages 804 is located within the bellow 802. In an aspect, the friction hinges hold the lid and the at least one microwave producing device in any desired position.

Figure 9:
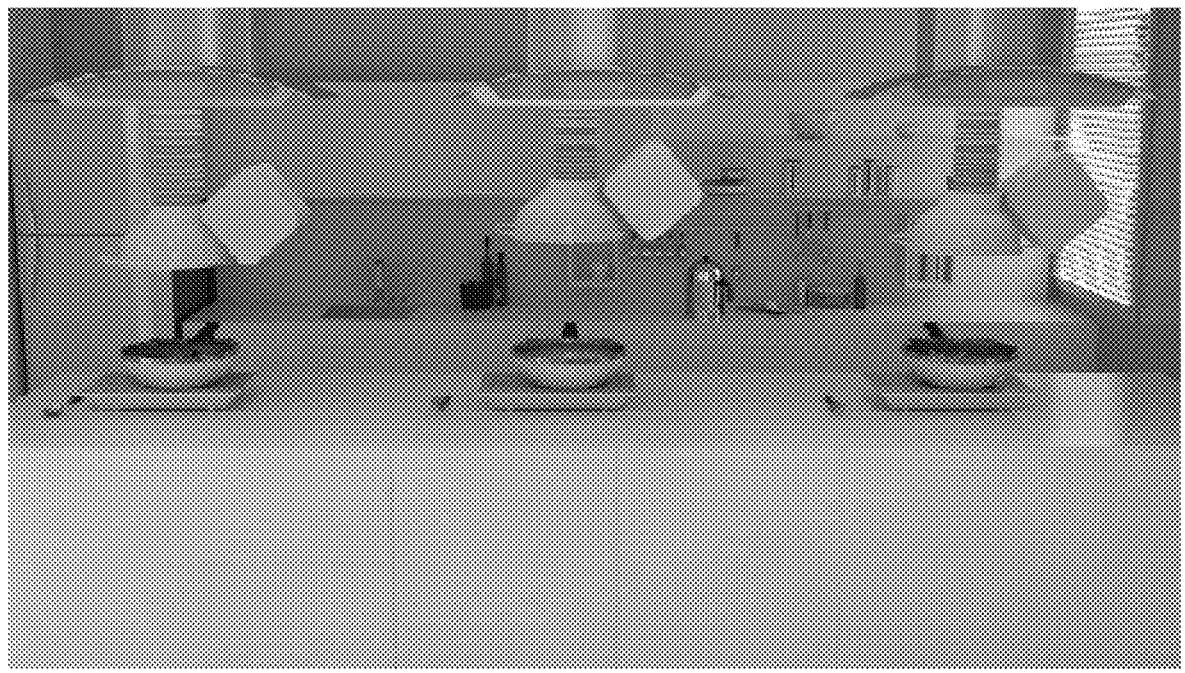
FIG. 9 illustrates a photograph of the 1 proposed microwave based cooking apparatus integrated with kitchen chimneys, in accordance with embodiments of the present disclosure.

FIG. 9 illustrates a photograph of the proposed microwave based cooking apparatus integrated with kitchen chimneys, in accordance with embodiments of the present disclosure. As shown, in a kitchen having a plurality of cooking stations, each of the chimneys in the kitchen can be integrated with the proposed cooking apparatus to provide microwave based heating/cooking in addition to cooking by conventional heat source.

Figure 10A:
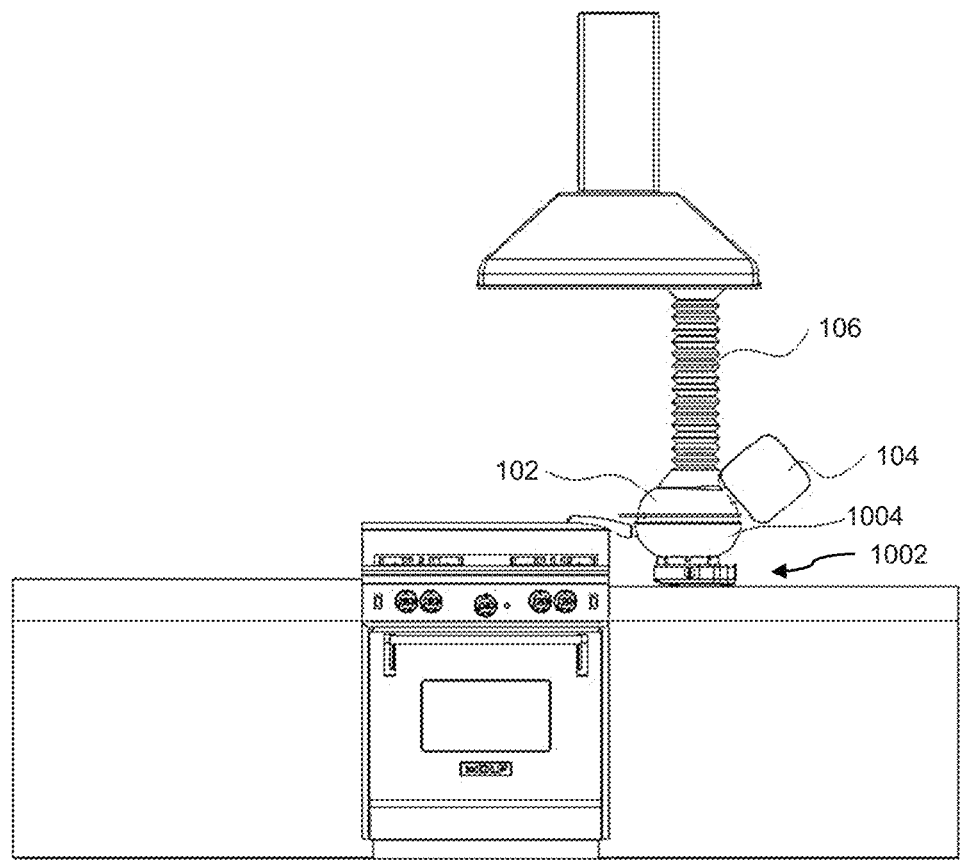
FIGS. 10A and 10B illustrate the proposed apparatus being used with a blender/mixer grinder, in accordance with an embodiment of the present disclosure.
Figure 10B:
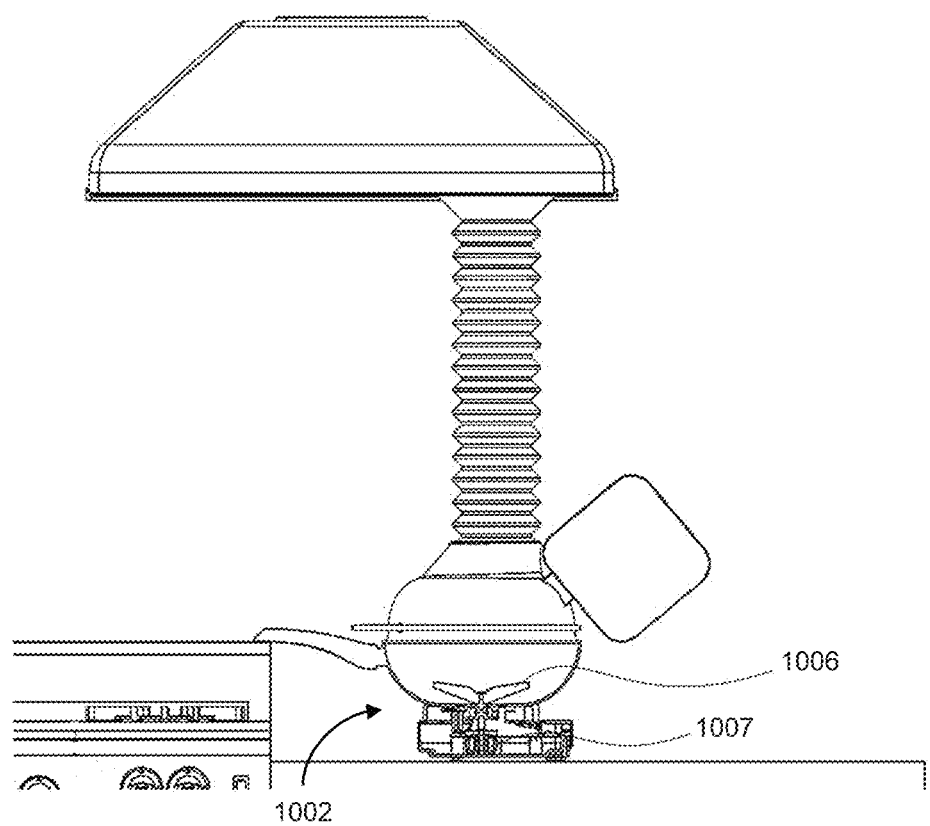

FIGS. 10A and 10B illustrate the proposed apparatus being used with a blender/mixer grinder 1002, in accordance with an embodiment of the present disclosure. As explained, the lid 102 and the coupled microwave producing device 104 can be moved horizontally to position the lid 102 over the container, referred to as a second container 1004, of the blender/mixer grinder 1002, and thereafter lowered such that the lid 102 covers the second container 1004. In this position the microwaves generated by the microwave producing device can be used to heat the contents in the second container in addition to any or combination of blending, grinding and mixing operations, which can be performed by blades 1006 driven by motor 1007 of the blender/mixer grinder 1002.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides a microwave based cooking apparatus that combines with other kitchen implements to provide microwave heating/cooking in combination with other preparatory operations and traditional methods of heating/cooking of food.

The present disclosure provides a microwave based cooking apparatus that can be integrated with other cooking implements thereby increasing its utility and reducing number of cooking implements required in kitchen.

The present disclosure provides a microwave based cooking apparatus that does not require any storage space on cooking platform in kitchen.

The present disclosure provides for a microwave based cooking apparatus that is always available for integration with other cooking implements.

I claim:

1. A cooking apparatus comprising:
   a lid;
   at least one microwave producing device that acts as a source of microwaves, and coupled with the lid;
   a lifting and lowering mechanism carrying the lid and the at least one microwave producing device at a lower end for enabling vertically raising and lowering the lid along with the at least one microwave producing device, wherein the lifting and lowering mechanism comprises:
     a top flange incorporating a pair of L shaped support lugs projection out of outer periphery of the top flange at two diametrically opposite locations;
     a metallic bellow having an upper end fixed to the top flange and a lower end fixed to the lid;
     a plurality of weight balancing linkages assembled in a set pattern with friction hinges, the set pattern of the plurality of weight balancing linkages allowing assembly of the weight balancing linkages to move between an extended position and a collapsed position; and wherein the assembly of the weight balancing linkages is located within the bellow; and wherein an upper end of the assembly of the weight balancing linkages is fixed to the top flange and a lower end is fixed to the lid to enable manual lifting and lowering of the lid and the at least one microwave producing device; and wherein the friction hinges hold the lid and the at least one microwave producing device in any desired position; and
   a rectangular frame configured on lower side of a chimney, wherein the L shaped support lugs of the of the top flange of the lifting and lowering mechanism engage with a pair of slots in two opposite sides of the rectangular frame to support the upper end of lifting and lowering mechanism, as well as to allow sliding of the lifting and lowering mechanism along with the attached lid and the at least one microwave producing device in the horizontal direction;
   wherein the lid in a lowered position gets operatively coupled with a container holding a food item, and wherein the container is any one of a first container for cooking food using conventional source of heat, and a second container for preparatory operations comprising any or a combination of blending, stirring, grinding and mixing; and
     wherein horizontally sliding the lid and the at least one microwave producing device enables the lid to be positioned over the first container or the second container, and thereafter coupling of the lid with the containers enables heating of the contents of the containers through the microwaves generated by the at least one microwave producing device.

2. The cooking apparatus of claim 1, wherein in the lowered position of the lid, when the lid couples with the container, the lid and the container form an enclosed space for holding the food items.

3. The cooking apparatus of claim 1, wherein the lid is coupled to the at least one microwave producing device through wave guide, wherein the wave guide guides microwaves generated by the at least one microwave producing device for their transfer from the at least one microwave producing device to the container.

4. The cooking apparatus of claim 1, wherein the lid and the first container are of a hemispherical shape to enable reflection of microwaves inside the lid and the container for efficient cooking.

5. The cooking apparatus of claim 1, wherein the cooking apparatus includes at least one power transformer, located within the chimney, for regulating input power to the at least one microwave producing device.

6. The cooking apparatus of claim 1, wherein the cooking apparatus incorporates a display screen for user interface.

7. The cooking apparatus of claim 1, wherein the cooking apparatus, when being used with the second container, is configured to allow simultaneous or iterative use of any or a combination of heating, stirring, blending and grinding.

8. The cooking apparatus of claim 1, wherein the cooking apparatus, when being used with the first container, is configured to allow simultaneous or iterative use of any or a combination of microwave cooking and conventional cooking.

9. The cooking apparatus of claim 1, wherein top of the container includes choke for preventing leakage of microwaves during working.

10. The cooking apparatus of claim 1, wherein the cooking apparatus is configured as a remotely operable device through any or a combination of Internet, Wi-Fi, Bluetooth, Zigbee, and Near-Field Communication (NFC).

* * * * *